(12) United States Patent
Kotani

(10) Patent No.: US 8,550,635 B2
(45) Date of Patent: Oct. 8, 2013

(54) PROJECTION SYSTEM

(75) Inventor: Junji Kotani, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 13/213,937

(22) Filed: Aug. 19, 2011

(65) Prior Publication Data

US 2012/0050698 A1 Mar. 1, 2012

(30) Foreign Application Priority Data

Aug. 25, 2010 (JP) ................... 2010-187859

(51) Int. Cl.
*G03B 21/14* (2006.01)

(52) U.S. Cl.
USPC ................. 353/94; 353/48; 348/745

(58) Field of Classification Search
USPC ............. 353/48, 69, 94, 121, 122; 348/333.1, 348/744, 745; 382/174; 345/204
See application file for complete search history.

(56) References Cited

U.S. PATENT DOCUMENTS 8,042,954 B2 * 10/2011 Tan et al. .................. 353/94

FOREIGN PATENT DOCUMENTS

| JP | 2000-241874 A | 9/2000 |
| JP | 2006-121240 A | 5/2006 |
| JP | 2006-245737 A | 9/2006 |

* cited by examiner

*Primary Examiner* — Kevin Pyo
(74) *Attorney, Agent, or Firm* — Canon U.S.A., Inc., IP Division

(57) ABSTRACT

A projection system includes a plurality of projection apparatuses. Each of the plurality of projection apparatuses includes a projection unit configured to project an image onto a projection surface, and an adjusting unit configured to adjust a state of displaying an image projected onto the projection surface by the projection unit. The projection system further includes a controller configured to cause the projection units of the plurality of projection apparatuses to simultaneously project a test image in different forms. The controller controls the adjusting unit of the plurality of projection apparatuses to adjust a state of displaying an image projected on the projection surface by the projection unit based on each state of displaying of the test images in different forms.

20 Claims, 6 Drawing Sheets

FIG. 5A

| THE NUMBER OF PROJECTORS | WAVELENGTH REGION FOR FIRST PROJECTOR | WAVELENGTH REGION FOR SECOND PROJECTOR | WAVELENGTH REGION FOR THIRD PROJECTOR |
|---|---|---|---|
| TWO | R | B | — |
| THREE | R | B | G |

FIG. 5B

| THE NUMBER OF PROJECTORS | WAVELENGTH REGION FOR FIRST PROJECTOR | WAVELENGTH REGION FOR SECOND PROJECTOR | WAVELENGTH REGION FOR THIRD PROJECTOR |
|---|---|---|---|
| TWO | LEFT HALF | RIGHT HALF | — |
| THREE | LEFT 1/3 | MIDDLE 1/3 | RIGHT 1/3 |

FIG. 5C

| THE NUMBER OF PROJECTORS | POLARIZED LIGHT FOR FIRST PROJECTOR | POLARIZED LIGHT FOR SECOND PROJECTOR |
|---|---|---|
| TWO | RIGHT CIRCULAR POLARIZED LIGHT | LEFT CIRCULAR POLARIZED LIGHT |

FIG. 5D

| THE NUMBER OF PROJECTORS | POLARIZED LIGHT FOR FIRST PROJECTOR | POLARIZED LIGHT FOR SECOND PROJECTOR |
|---|---|---|
| TWO | P-POLARIZED LIGHT | S-POLARIZED LIGHT |

PROJECTION SYSTEM

BACKGROUND OF THE INVENTION

1. Field of the Invention

The present invention relates to a projection system.

2. Description of the Related Art

Projectors have hitherto widely been used, each of which forms an optical image on a light bulb, such as a liquid crystal panel, according to an input video signal and projects and displays the image onto the outside. The projectors need various adjustment operations such as focus adjustment, keystone distortion adjustment, and zoom adjustment operations to realize excellent display.

One projector is designed to be manually controlled by a user himself using an operation member. There is another projector that captures a projected image of a test pattern or the like and automatically performs various adjustment operations thereon. Japanese Patent Application Laid-Open No. 2006-121240 discusses a projector that detects, from an image captured by a camera unit, the positions of four corners of each of an area, onto which an image is projected, and the positions of four corners of the projected image and carries out calculation thereon, so that zoom ratio adjustment and keystone-distortion adjustment is carried out.

Japanese Patent Application Laid-Open No. 2000-241874 discusses a technique for projecting a predetermined test pattern or an entirely white image is projected onto a screen from a projector, then capturing the image projected onto the screen, and adjusting a focal length and a zoom ratio and correcting keystone distortion.

A type of usage of a projector is stack projection that realizes high brightness by projecting same images onto a single place from a plurality of projectors, respectively, to overlap with one another. Japanese Patent Application Laid-Open No. 2006-245737 discusses an automatic adjustment technique for use in stack projection by two projection display devices. Specifically, two projection units are caused to project test images onto a projection surface at different timings at each of which the test image is captured. Then, image displacement between the each test images of the projection units and keystone distortion are corrected, based on the each captured test images.

SUMMARY OF THE INVENTION

According to an aspect of the present invention, a projection system includes a plurality of projection apparatuses. Each of the plurality of projection apparatuses includes a projection unit configured to project an image onto a projection surface, and an adjusting unit configured to adjust a state of displaying an image projected onto the projection surface by the projection unit. The projection system further includes a controller configured to cause the projection units of the plurality of projection apparatuses to simultaneously project a test image in different forms. The controller controls the adjusting unit of the plurality of projection apparatuses to adjust a state of displaying an image projected on the projection surface by the projection unit based on each state of displaying of the test images in different forms.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A through 5D are exemplary examples of assignment for test pattern images.

DESCRIPTION OF THE EMBODIMENTS

Various exemplary embodiments, features, and aspects of the invention will be described in detail below with reference to the drawings.

Figure 1:
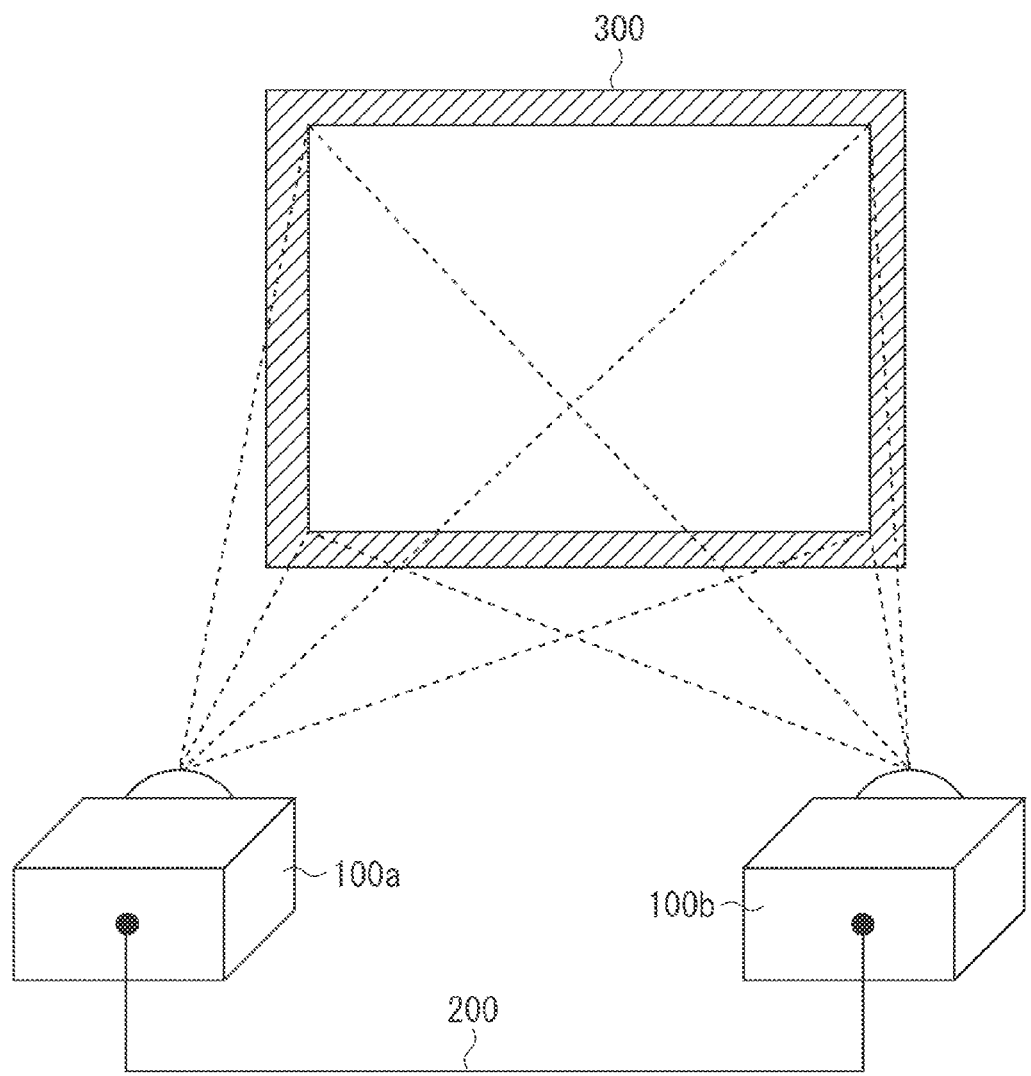
FIG. 1 is a schematic-diagram illustrating a configuration of a system arranged in a stack configuration, which is an exemplary embodiment according to the present invention.

FIG. 1 is a schematic diagram illustrating a configuration of a first exemplary embodiment of a projection display system according to the present invention. The first exemplary embodiment is a multi-projection system configured to perform stack projection using two projectors (projection display apparatus) respectively incorporating liquid crystal panels.

Projectors 100a and 100b are connected to each other with an Ethernet (registered trademark) cable 200 to be communicable to each other. A configuration of connection between the projectors 100a and 100b is not limited thereto. As long as data communication therebetween can be performed, any method can be employed. For example, a recommended standard (RS) 232C or wireless local area network (LAN) can be used. The projectors 100a and 100b constitute stack projection. Images from the projectors 100a and 100b are projected onto a screen 300 so that the images are superimposed to each other. Thus, high-brightness image can be displayed.

Figure 2:
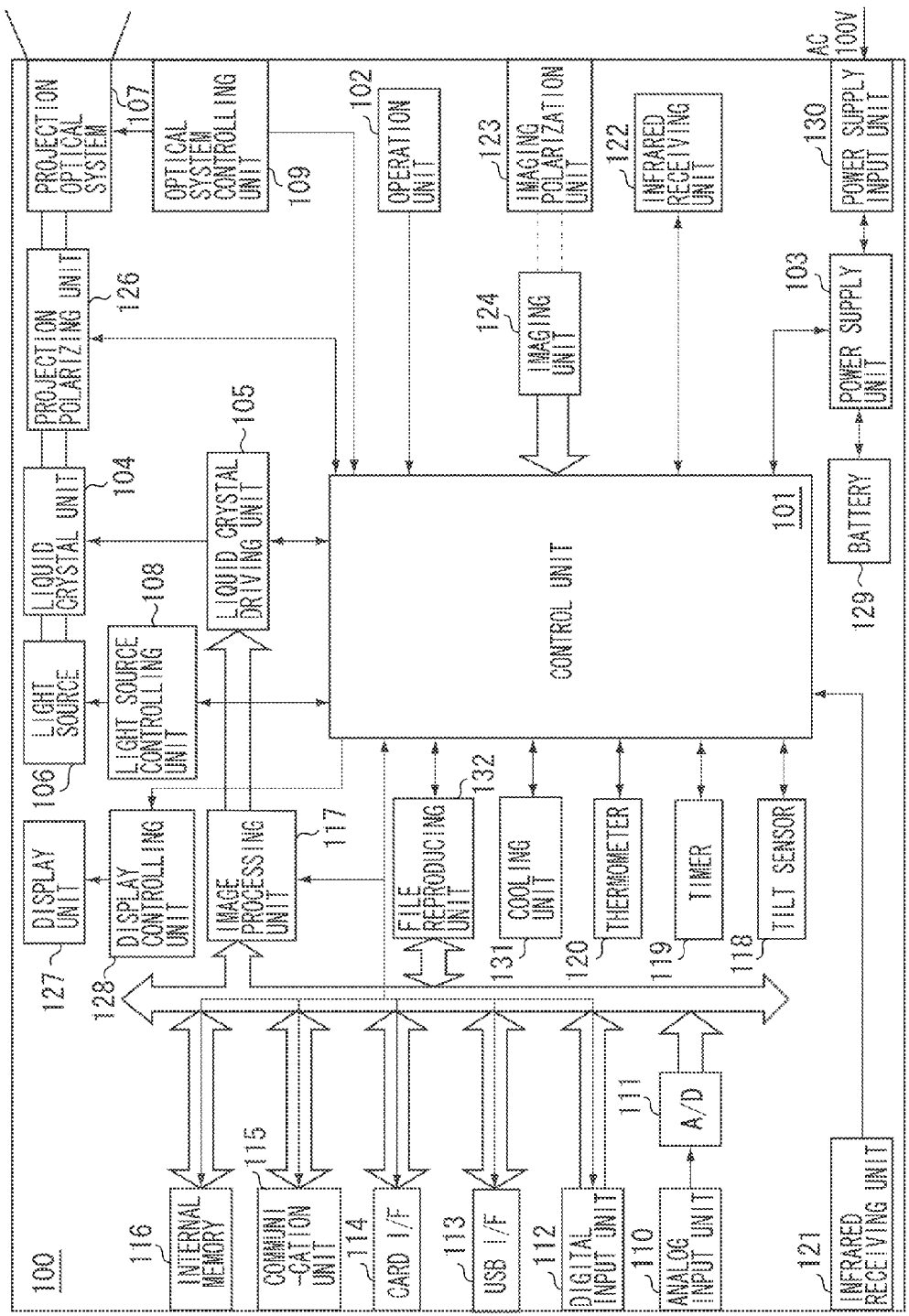
FIG. 2 is a schematic block diagram illustrating a configuration of a projector according to an exemplary embodiment of the present invention.

FIG. 2 is a schematic block diagram illustrating a configuration of each of the projectors 100a and 100b. A projector 100 illustrated in FIG. 2 represents the projectors 100a and 100b. The projectors 100a and 100b have the same configuration.

A control unit 101 controls each block of the projector 100. An operation unit 102 receives an operation from a user. A power supply unit 103 controls power supply to each block of the projector 100. A liquid crystal unit 104 is configured to include one or three liquid crystal panels and to form an image on each liquid crystal panel. A liquid crystal driving unit 105 forms an image on each liquid crystal panel of the liquid crystal unit 104, based on input image signals. A light source 106 supplies light to the liquid crystal unit 104. A projection optical system 107 that projects, onto the screen 300, an optical image obtained by supplying light output from the light source 106 to the liquid crystal unit 104. A light source controlling unit 108 controls an amount of light output from the light source 106. An optical system controlling unit 109 controls operations of a zoom lens, a focusing lens of the projection optical system 107 and performs zoom magnification adjustment and focusing.

An analog input unit 110 receives analog video signals from a personal computer (PC), a digital versatile disc (DVD) reproduction unit, and a television tuner, and includes red, green, and blue (RGB) terminals, and an S-terminal. An analog-to-digital (A/D) conversion unit 111 converts, into digital signals, video signals input to the analog input unit 110. A digital input unit 112 receives digital video signals from the PC, and the DVD reproducing unit, and includes a high-definition multimedia interface (HDMI) terminal. If the digital input unit 112 is a HDMI terminal, control signals can simultaneously be transmitted from an external device thereby to control the projection of images.

A universal serial bus (USB) interface 113 receives various information data files, such as video data, image data and video files, from external devices and writes various information data files thereto. A pointing device, a keyboard, or a USB-type flash memory can be connected to the USB interface 113.

A card interface 114 reads and writes various information data files, such as video data, image data, and video files, from and to card recording media. The card interface 114 is configured such that a card recording medium can be inserted thereinto. A communication unit 115 transmits and receives various information data files, such as video data, image data and video files, or other instruction signals via an intranet and the Internet. The communication unit 115 is configured to include a wired LAN or a wireless LAN. If the communication unit 115 includes a wired LAN, a cable 200 is connected to the communication unit 115. An internal memory 116 saves various information data files, such as video data, image data or video files, and includes a semiconductor memory and a hard disk.

For example, document files input from the card interface 114 are reproduced by a file reproducing unit 132. The file reproducing unit 132 generates, from the document files, image signals to be presented to users, and outputs the generated image signals to an image processing unit 117. Video signals or image signals input from the digital input unit 112 are input directly to the image processing unit 117.

The image processing unit 117 performs, on image signals obtained by the interfaces 113 and 114 and the file reproducing unit 132 and video signals obtained by the control unit 101, correction suitable for displaying images in the liquid crystal unit 104. For example, the image processing unit 117 performs, e.g., conversion to set the number of pixels represented by image signals to be equal to that of pixels of the liquid crystal panel, and doubling of the number of frames of input video signals for alternating-current (AC) driving of the liquid crystal panel. Thus, the image processing unit 117 performs the correction suitable for formation of images by the liquid crystal panel. The AC driving of the liquid crystal panel is a method for displaying images by alternately changing the direction of a voltage applied to liquid crystals of the liquid crystal panel. This method utilizes the liquid crystal panel's property that the liquid crystal panel can generate images regardless of which one of positive and opposite directions the direction of application of a voltage to the liquid crystals is. In this case, it is necessary to alternately send an image corresponding to the positive direction and another image corresponding to the opposite direction one by one to the liquid crystal driving unit 105. Accordingly, the image processing unit 117 performs processing to double the number of frames of video signals. The liquid crystal driving unit 105 causes the liquid crystal panel of the liquid crystal unit 104 to generate images based on image signals sent thereto from the image processing unit 117.

The image processing unit 117 also performs keystone correction for deforming, when an image is projected obliquely onto the screen to cause, e.g., keystone distortion of the projected image, the distorted image to eliminate the keystone distortion. When performing the keystone correction, the image processing unit 117 changes a scale factor in the horizontal-direction/vertical-direction of an image to be displayed on the liquid crystal panel. In other words, the keystone distortion of a projection screen is canceled by distortion of a video region displayed on the liquid crystal panel. Consequently, the projected image is displayed on the screen with being close to the image display region which is a rectangular with a normal aspect ratio. The keystone correction can automatically be performed, based on a tilt angle obtained by a tilt sensor 118. Alternatively, a user can execute the keystone correction by operating the operation unit 102.

The tilt sensor 118 detects the tilt angle of the projector 100. A timer 119 detects an operating time of the projector 100 and the each block. A thermometer 120 measures the temperature of the light source 106 of the projector 100, the temperature of the liquid crystal unit 104, and ambient temperature.

Infrared receiving units 121 and 122 receives infrared-light from a remote control device attached to the projector 100, and other devices, and send signals to the control unit 101. The infrared receiving units are installed at a plurality of places located in, e.g., an anteroposterior direction of the projector 100. In the present exemplary embodiment, the infrared receiving unit 121 is disposed in the rear of a projector body, while the infrared receiving unit 122 is placed in front thereof.

An imaging unit 124 captures an image in the direction of the screen 300. The imaging unit 124 is provided with an area sensor that captures an image in three primary colors (RGB), which is projected onto the screen 300.

A display unit 127 is disposed in the body of the projector 100 and displays states, warnings, and the like of the projector 100. A display controlling unit 128 controls the display unit 127.

A battery 129 supplies electric power when the body of the projector 100 is carried and used. A power supply input unit 130 receives AC electric-power from a outside, rectifies the power to a predetermined voltage, and supplies the voltage to the power supply unit 103.

A cooling unit 131 cools the projector 100 by releasing heat from the inside of the projector 100. The cooling unit 131 is configured to include, e.g., a heat sink and a fan.

Each projector 100 projects images in different polarization states. Accordingly, only an originating projector can capture a projected image even when a plurality of projectors simultaneously project images, so that the projectors 100 can adjust a projection condition independent from one another. Thus, each projector 100 has a polarizer, i.e., a projection polarizing unit 126 provided in the projection optical system 107, which converts the state of a projected image into a predetermined polarization state. Each projector 100 also has an analyzer, i.e., an imaging polarization unit 123, which allows a projected image in the polarization state to pass therethrough. If the adjustment of the projection condition using polarized light is not performed, each of the projection polarizing unit 126 and the imaging polarization unit 123 is retracted by an actuator (not shown) from an associated optical path.

An operation (single projection operation) in the case of using the projector 100 singly is described hereinafter with reference to FIG. 4.

When AC power is supplied to the power input unit 130, the control unit 101 is activated. Thus, a process described in a flowchart illustrated in FIG. 4 is started. The flow illustrated in FIG. 4 is executed by causing the control unit 101 of each of the projectors 100*a* and 100*b* to control each block of an associated one of the projectors 100*a* and 100*b*.

In step S001, the control unit 101 monitors the operation unit 102 and the communication unit 115 and waits for issuance of a power-on instruction.

When a power-on instruction is issued, in step S002, the control unit 101 refers to a flag stored in the internal memory 116 and determines whether stack projection is set. In this case, it is assumed that the stack projection is not set (Flag=0). Then, the control proceeds to step S003. In step S003, the control unit 101 issues, to the power supply unit 103, an instruction to supply electric power to each block. Thus, the control unit 101 causes each block to be a standby state. After power is on, the control unit 101 instructs the light source controlling unit 108 to cause the light source 106 to output light.

Figure 3A:
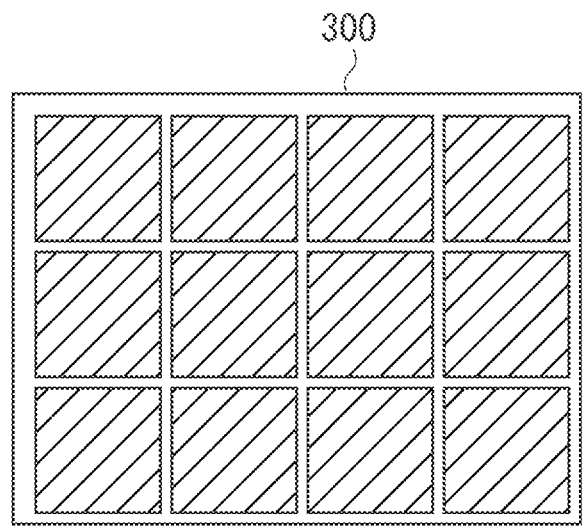
FIGS. 3A and 3B are schematic-diagrams respectively illustrating examples of a displayed test pattern.
Figure 3B:
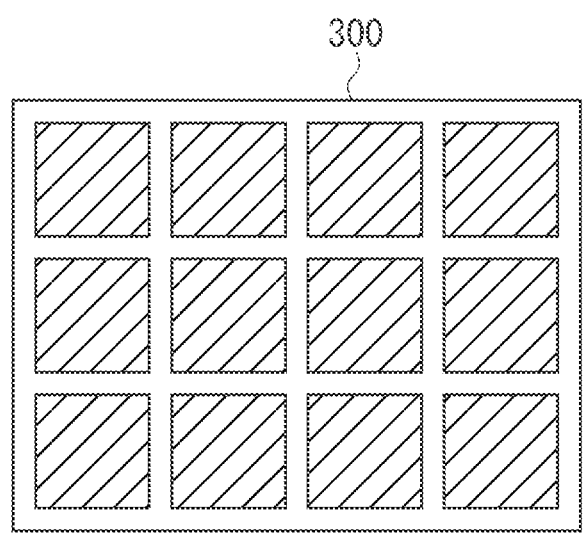

In step S004, to perform focusing, the control unit 101 loads a test pattern image preliminarily stored in the internal memory 116 and causes the liquid crystal unit 104 to display the test pattern image via the image processing unit 117. FIGS. 3A and 3B illustrate examples of displaying the screen 300 of a test pattern image. FIG. 3A illustrates the screen 300 in a case where a focusing lens of the projection optical system 107 is focused thereon. FIG. 3B illustrates the screen 300 in a case where the focusing lens of the projection optical system 107 is not focused thereon. In the case illustrated in FIG. 3A, a cross-hatched pattern is displayed clearly. In the case illustrated in FIG. 3B, the cross-hatched pattern is indistinctly displayed. This test pattern image is an example of an adjusting image for adjusting the projection state of the projector 100. As necessary, images having various properties, shapes or patterns can be used as the test pattern image.

In step S005, the control unit 101 causes the imaging unit 124 to capture the cross-hatched test pattern image. The focusing lens of the projection optical system 107 is driven so that the sharpness of the captured cross hatched image is highest. Consequently, the focus of the projection optical system 107 is adjusted.

In step S006, the control unit 101 erases the test pattern displayed in the liquid crystal unit 104. In step S007, the control unit 101 ends the flow illustrated in FIG. 4. Then, the projector 100 is shifted into a normal projection state.

If the projector 100 is shifted into the normal projection state, the projector 100 starts processing to project an input image. For example, a video signal input to the digital input unit 112 is converted by the image processing unit 117 into that having a resolution suitable for the liquid crystal unit 104. Gamma correction, brightness variation countermeasure correction, keystone correction are applied to the image obtained by the conversion. The liquid crystal driving unit 105 drives the liquid crystal unit 104 according to video signals to which the correction is applied by the image processing unit 117. Thus, an image corresponding to the corrected video signal is formed.

The image formed on the liquid crystal panel of the liquid crystal unit 104 is guided from the light source 106 to the projection optical system 107. The projection optical system 107 projects an image onto the screen 300.

During image projection, the control unit 101 detects the temperature of the light source 106 with the thermometer 120. When the temperature of the light source 106 is higher than or equal to 40 degrees Centigrade, the control unit 101 causes the cooling unit 131 to operate to cool the projector 100.

If a user operates the operation unit 102 to power-off, the control unit 101 instructs each block to perform end-processing. When the preparation for end-processing is completed, the power supply unit 103 sequentially ends operations of supplying electric power to the blocks. The cooling unit 131 cools the projector 100 by operating for a while after a power-off operation.

Although the operation in the case of projecting and displaying an image of video signals input from the digital input unit 112 has been described, a similar operation is performed even in the case of displaying an image of video data input from the various interfaces.

Hereinafter, operations performed by the projectors 100a and 100b in the stack projection illustrated in FIG. 1 are described with reference to FIG. 4. Both of the control units 101 of the projectors 100a and 100b set a flag indicating a stack projection mode (Flag=1) as the flag representing the projection state. The set value of the flag is stored in the internal memory 116. This setting can preliminarily be input by the operation unit 102 of each of the projectors 100a and 100b. Alternatively, such information can be input by the communication unit 115. When one of the projectors 100a (or 100b) is activated, an imaging unit detects that the other projector 100b (or 100a) projects an image onto the same screen. In addition, it may be notified by communication that the projectors 100a and 100b are provided in a stack projection configuration. Moreover, the setting can be performed using an identifier adapted to have an integer value such that if the integer value is 0, the identifier indicates stack projection, and that if the integer value is other than 0, the integer value identifies a stack projection set, instead of using the flag. This method can be applied to a plurality of stack projection sets.

In step S001, it is assumed that AC power is supplied to the projectors 100a and 100b, that the projector 100a is used as a master, and that a user gives a power-on instruction to the projector 100a.

In step S002, the control unit 101 refers to the flag indicating stack projection, which is stored in the internal memory 116, and determines whether the configuration is set to the stack projection configuration. As described above, the stack projection mode is set (Flag=1), so that control proceeds to step S008.

In step S008, the projector 100a is treated as a master, by receiving a power-on instruction from a user. Then, the control of the projector 100a proceeds to step S009.

In step S009, the projector 100a broadcasts, to devices connected thereto, an inquiry about the projectors configured to perform the stack projection, using the communication unit 115. The inquiry reaches the projector 100b, and then the projector 100b sends to the projector 100a a response indicating that the projector 100b configures the stack projection configuration. The projector 100a receives the response and identifies the presence of one or more projectors (the single projector 100b in the present exemplary embodiment) configuring the stack projection configuration other than the projector 100a.

In step S010, the projector 100a determines how wavelength ranges of test pattern projection light are assigned to the respective projectors configuring the stack projection configuration. More specifically, a table illustrated in FIG. 5A is preliminarily stored in the internal memory 116. Then, the wavelength range to be assigned to each projector is determined by referring the stored table according to the number of projectors configuring the stack projection configuration. For example, in the present exemplary embodiment, two projectors 100a and 100b configure the stack projection configuration. Thus, the wavelength range assigned to the (first) projector 100a is determined to be red (R), while the wavelength range assigned to the (second) projector 100b is determined to be blue (B).

In step S011, the projector 100a instructs the projector 100b to be activated, which is identified in step S009 as configuring the stack projection configuration other than the projector 100a.

In step S012, the projector 100a instructs the projector 100b to be subjected to the assignment of the wavelength range determined in step S010 thereto. In step S013, the projector 100a causes the light source 106 thereof to emit light, similarly to step S003. In step S014, the projector 100a projects and displays a test pattern image to and on the screen 300, similarly to step S004. However, the projector 100a projects the test pattern image in the wavelength range previously determined in step S010. According to the foregoing description, the wavelength range assigned to the projector 100a is the R. Thus, the control unit 101 of the projector 100a causes the image processing unit 117 to process the test pattern image so that R-component is maximized, and that each of G (Green)-component and B-component is set to be 0. Consequently, the test pattern image of R-component is displayed in the liquid crystal unit 104. Thus, the test pattern image of light within the wavelength range R is projected thereonto.

In step S015, the projector 100a captures the test pattern image projected on the screen 300, similarly to step S005. Then, the projector 100a adjusts the focus of the projection optical system 107 using the color component-image having wavelengths set to be within the wavelength range assigned thereto among those of the captured image. The control unit 101 of the projector 100a functions as a projection control means for adjusting a focus serving as the projection condition. For example, the wavelength range assigned to the projector 100a is the R. Thus, the projector 100a drives the focusing lens of the projection optical system 107 such that the sharpness of the R-component of the imaged cross-hatched image is high.

In step S006, the projector 100a stops the projection of the test pattern image.

In step S007, the projector 100a proceeds to the normal projection state.

An operation of the projector 100b instructed by the projector 100a to be activated is described hereinafter. The projector 100b serves as a slave.

In step S002, the control unit 101 of the projector 100b refers to the flag stored in the internal memory 116 and determines whether the stack projection is set. Since the stack projection is set (Flag=1), as described above, control proceeds to step S008.

In step S008, the projector 100b is treated as a slave, by receiving a power-on instruction from another projector (the projector 100a in the present exemplary embodiment). Accordingly, control proceeds to step S016.

In step S016, the projector 100b is instructed from the projector 100a serving as the master to be subjected to the assignment of the wavelength range of the test pattern projection light, which is determined in step S010 by the master, that is, the range B (blue color).

In step S017, the projector 100b causes its own light source 106 to emit light, similarly to steps S003 and S013.

In step S018, the projector 100b displays the test pattern image with the projection light whose wavelengths are within the notified wavelength range. More specifically, the wavelength range assigned to the projector 100b is the B, as described above. Thus, the control unit 101 causes the image processing unit 117 to process the test pattern image such that the B-component is maximized, and that the G-component and the R-component are set to 0. Consequently, the test pattern image configured only by the B-component is displayed in the liquid crystal unit 104, so that a cross-hatched test pattern image of light whose wavelengths are within the wavelength range B is projected.

In step S019, the projector 100b captures the test pattern image projected onto the screen 300 and adjusts the focus of the projection optical system 107 using, similarly to step S015. In addition, the projector 100b adjusts the focus of the projection optical system 107 using the color component-image having wavelengths set to be within the wavelength range assigned thereto among those of the captured image. The control unit 101 of the projector 100b functions as a projection control means for adjusting a focus serving as the projection condition. For example, the wavelength range assigned to the projector 100b is the B. Thus, the projector 100b drives the focusing lens of its own projection optical system 107 such that the sharpness of the B-component of the captured cross-hatched image is high.

In step S006, the projector 100b stops the projection of the test pattern image.

In step S007, the projector 100b proceeds to the normal projection state.

Thus, in the present exemplary embodiment, when the stack projection using a plurality of projectors is performed, the projector first receiving a power-on instruction from a user is set as a master, while the other projectors are set as slaves, the power-on of each of which is instructed by the master. The master determines the projection wavelength ranges of light of the test pattern display, which are respectively assigned to the projectors so as to vary with the projectors. Each of the projectors performs automatic adjustment of the focus of the projection optical system using the determined wavelength ranges.

Each of the projectors performs an adjustment operation in the wavelength range differing from those assigned to the other projectors, so that the projection conditions can simultaneously be adjusted without being affected by the test patterns respectively corresponding to the other projectors. Consequently, even though the projection system is configured to include a plurality of projectors, the adjustment of all of the projectors can end within an adjustment time for one projector.

The number of projectors configuring the stack projection configuration is set to be 2 in this exemplary example. However, 3 or more projectors can be employed. The present invention can be applied to a case where the number of projectors configuring the stack projection configuration is equal to or less than the number of wavelength ranges assigned to the projectors so that the projectors can project and capture images separately from one another. For example, if the number of projectors configuring the stack projection configuration is 3, it is advisable to set the wavelength ranges assigned to the projectors as the ranges R, B, and G, respectively, as illustrated in FIG. 5A.

The present exemplary embodiment uses the wavelength ranges R and B as those respectively assigned to the two projectors. However, the combination of such wavelength ranges is not limited thereto. As long as the imaging of the test pattern and the adjustment of the projection condition can be performed by the projectors in the wavelength range assigned thereto, separately from each other in the wavelength ranges in a post-process, any other combination of such wavelength ranges can be employed. For example, the combination of the wavelength range B and R, range R and G, range G and R, range G and B, and range B and R can be employed. If a combination of wavelength ranges is such that the wavelength ranges do not adjoin one another, it is unnecessary to divide the entire wavelength region into the each wavelength ranges with a filter having a steep characteristic during capturing of the projected image. Thus, it helps to avoid confusion with the each wavelength ranges one another. More specifically, if the three wavelength ranges R, G, and B are used, the combination of the wavelength ranges R and B or the wavelength ranges B and R may be used.

The present exemplary embodiment uses the three wavelength ranges R, G, AND B. However, four wavelength ranges obtained by adding an infrared range to the three wavelength ranges can be used. In addition, five or more wavelength ranges can be used.

An exemplary embodiment of the projector incorporating the liquid crystal panel has been described. However, the present invention can be applied to any other type projection apparatus, as long as the projectors can project light of a separated wavelength range even if the projectors incorporate a digital micromirror device (DMD) panel.

The exemplary embodiment has been described, which is configured to divide the projectors into a master and slaves. However, the system can be configured such that an external control device (e.g., a PC) is set as the master serving as the control unit, while the projectors are set as slaves. In this case, in a process performed by the external control unit (e.g., a PC), steps concerning the projection and the adjustment of the external control unit itself are made unnecessary in the flowchart illustrated in FIG. 4. Thus, the control device executes mainly the processing and the instructions, which correspond to steps S009 to S012 illustrated in FIG. 4.

According to the present exemplary embodiment, the activation of the master is used as a trigger for the activation and the adjustment of the slaves. However, the present invention is not limited to the type of the trigger. For example, the system can be modified by providing a button serving as a trigger in the operation unit 102 of the master so that the activation and the adjustment of each slave are started by a user's depression of the button.

A second exemplary embodiment of the present invention is described hereinafter. Although a focus is adjusted as an example of the projection condition in the first exemplary embodiment, the present invention can be applied to the adjustment of other projection conditions. The other projection conditions are, e.g., a zoom ratio, and a keystone distortion correction. Hereinafter, an exemplary embodiment for adjusting a region of a projected image to a predetermined rectangular range of the screen using the zoom ratio and the keystone distortion correction is described.

More specifically, a test pattern is employed, which facilitates discrimination of edges of a projected image. Then, the adjustment of the zoom ratio of the projected image and the correction of the keystone distortion correction are executed, instead of performing a focusing operation (to be performed at the master insteps S014 and S015, or at the slave in steps S018 and S019) illustrated in FIG. 4.

For example, the coordinates of the four corners of the projected image are detected from an image obtained by capturing the projected test pattern image. Then, the zoom ratio of the projected image is adjusted, and the keystone distortion is corrected such that the coordinates of the four corners are in agreement with those of the four corners of a desired region, in which a projected image is displayed, on the screen. The coordinates of the four corners of the desired region can preliminarily be measured or can be determined according to a result of simultaneously capturing the projected image. For example, the coordinates of the four corners of the desired region can be determined from the captured image by marking the four corners on the screen with a minute reflection material or a minute color material.

A third exemplary embodiment is described hereinafter. In the first exemplary embodiment, the test pattern images respectively projected by the projectors 100a and 100b overlap partly or completely with each other on the screen 300. However, other test pattern images can be employed, which are adapted to avoiding overlap with each other. For example, as illustrated in FIG. 5B, display locations for displaying the test pattern image, which are mutually exclusive from each other, are assigned to the projectors, respectively. An assignment table representing such information is preliminarily stored in the memory 116 of each projector 100.

Figure 4:
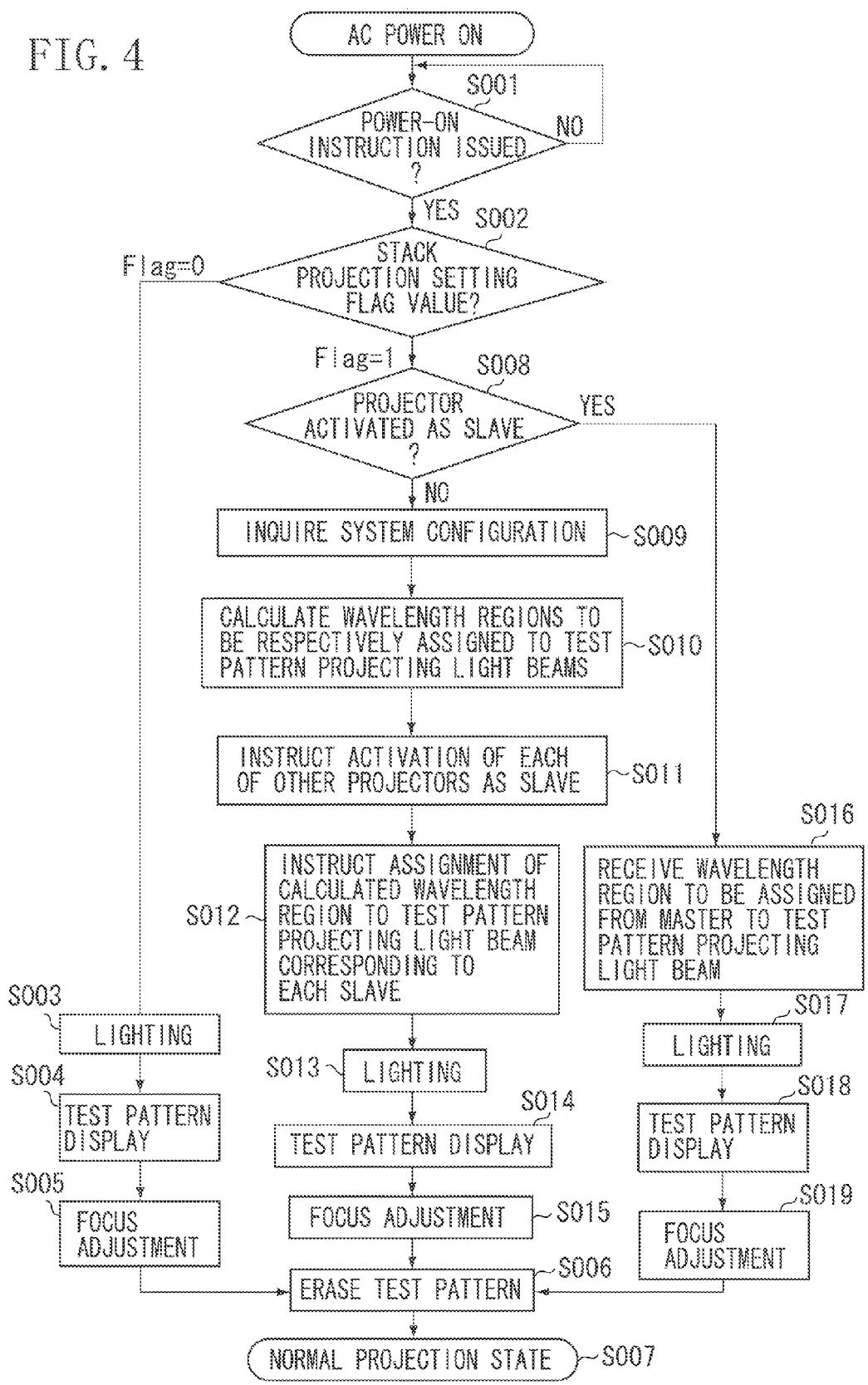
FIG. 4 is a flowchart illustrating an operation according to an exemplary embodiment.

An operation of the projector 100a serving as the master is described hereinafter by setting forth changes from the operation whose flow is illustrated in FIG. 4.

Step S010 in the flowchart illustrated in FIG. 4 is changed as follows. Specifically, the projection positions on the screen 300, to which a test pattern image is projected, are assigned to the projectors which configure the stack projection configuration. More specifically, a table illustrated in FIG. 5B is preliminarily stored in the internal memory 116. The projection position to which the test pattern image is projected from each projector is determined from the number of projectors configuring the stack projection configuration by referring to the table. If the projectors configuring the stack projection configuration are two projectors, i.e., the projectors 100a, and 100b, the projection position of the projector 100a (first projector) is set at a left half of the screen 300, as viewed in FIG. 5B. On the other hand, the projection position of the projector 100b (second projector) is set at a right half of the screen 300.

Step S012 is changed as follows. Specifically, the assignment of wavelength ranges which is instructed to the projectors 100a and 100b is changed to the assignment of the projection positions.

Step S014 is changed as follows. Specifically, similarly to the above step S004, the projector 100a serving as the master projects and displays a test pattern image at the projection position previously determined. In the example illustrated in FIG. 5B, the projection position assigned to the projector 100a is the left half position. Thus, the control unit 101 causes the image processing unit 117 to process the test pattern image so that the gray level of the right-half image is 0. The test pattern image configured to include only the left half is displayed in the liquid crystal unit 104. Thus, the test pattern image is projected whose projection field angle is a left half of an ordinary projection field angle.

Step S015 is changed as follows. Specifically, the projector 100a adjusts the focus of the projection optical system 107 using an image obtained by capturing the test pattern image projected by the projector 100a. The control unit 101 of the projector 100a functions as a projection control means for adjusting the focus as the projection condition. More specifically, the projection position assigned to the projector 100a is a left half position. Thus, the focusing lens of the projection optical system 107 is driven so that the sharpness of only the left half of the captured test pattern image is high.

An operation of the projector 100b serving as the slave, which is instructed to be activated, is described by setting forth changes from the flowchart illustrated in FIG. 4.

Step S016 is changed as follows. Specifically, the projection position, to which the test pattern projection light is projected, is designated by the master.

Step S018 is changed as follows. Specifically, the test pattern image is projected onto and displayed at a notified projection position. More specifically, the projection position assigned to the projector 100b is the right half position, as described above. Thus, the control unit 101 instructs the image processing unit 117 to process the test pattern image to set the gray level of the left half of the image at 0. The test pattern image configured to include only the right half is displayed in the liquid crystal unit 104. Thus, the test pattern, whose projection field angle is the right half of the ordinary projection field angle, is projected.

Step S019 is changed as follows. Specifically, the projector 100b adjusts the focus of the projection optical system 107 using the captured image of the test pattern image at the projection position assigned thereto. The control unit 101 of the projector 100b functions as the projection control means for adjusting the focus as the projection condition.

Thus, according to the present exemplary embodiment, each projector configuring the stack projection configuration projects the test pattern image to the projection position at which the projected images do not overlap with each other. Consequently, each projector can simultaneously adjust the focus using the test pattern image projected by itself. Accordingly, the focuses of all of the projectors can be adjusted in an adjustment time taken to adjust the focus of a single projector.

Although the present exemplary embodiment sets the number of projectors configuring the stack projection configuration at 2, apparently, the present invention can be applied to a case where the number of projectors is 3 or more, as long as the projectors configuring the stack projection configuration can project and image the test pattern image at the projection position at which the test pattern images do not overlap with each other. For example, if the number of projectors configuring the stack projection configuration is 3, it is advisable to set the projection positions respectively assigned to the projectors at a left one-third position, a central one-third position, and a left one-third position, as viewed in FIG. 5B.

The test pattern images can preliminarily be stored in the memory 116. Alternatively, the control unit 101 can generate the test pattern images by calculation, if necessary. The control unit 101 can generate a test pattern image of a necessary size, instead of causing the image processing unit 117 to set the gray level of a half of an original test pattern image at 0.

Although the exemplary embodiment adapted to divide the projectors configuring the stack projection configuration into the master and the slave is described, the system can be configured such that the master serving as the control unit is set to be an external control device (e.g., a PC), and that each projector is configured to be set as the slave. In this case, steps concerning the projection and the adjustment of the projector itself in the flow illustrated in FIG. 4 are unnecessary for the flow of a process performed by the external control means (e.g., a PC). Then, the control device executes mainly the processing and the instructions corresponding to steps S009 to S012 illustrated in FIG. 4.

Figure 6:
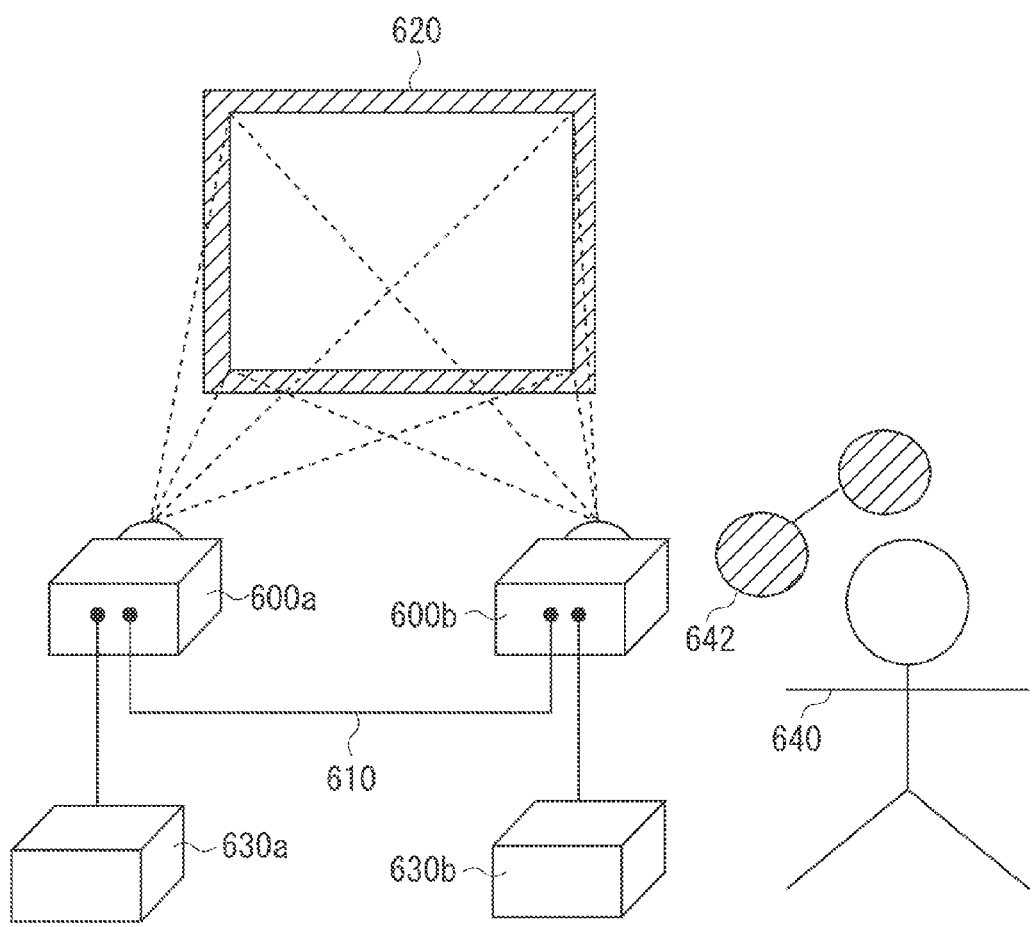
FIG. 6 is a schematic-diagram illustrating a configuration of a system arranged in a stereo configuration.

A fourth exemplary embodiment is described hereinafter. The present exemplary embodiment is described hereinafter, in which two projectors are arranged in a stereo configuration for polarization-type three-dimensional stereoscopic display. FIG. 6 is a schematic-diagram illustrating a configuration of a projection system.

Projectors 600a and 600b are connected to each other with an Ethernet (registered trademark) cable 610 to be communicable to each other. Video sources 630a and 630b supply to the projectors 600a and 600b video signals respectively corresponding to a left-eye-image and a right-eye-image for the stereoscopic display. The projectors 600a and 600b project images respectively corresponding to the video signals sent from the video sources 630a and 630b, with polarization properties orthogonal to each other, onto the same position on a screen 620.

The screen 620 is a silver screen. The screen 620 has a property of reflecting incident light with substantially maintaining the polarization state of the incident light as the surface is applied metal. A user 640 observes the screen 620 while wearing polarized glasses 642. The polarized glasses 642 are such that the transmission polarization properties of both eyes respectively correspond to the polarization properties of the projected images by the projectors 600a and 600b. Consequently, the image of the projector 600a is incident upon the left eye of the user 640. The image of the projector 600b is incident upon the right eye of the user 640. Thus, the user 640 can stereoscopically view the images of the video signals sent from the video sources 630a and 630b.

Each of the projectors 600a and 600b is in the configuration illustrated in FIG. 2 and utilizes a projection polarization unit 126 to make the projection image a specific polarization state. In addition, each of the projectors 600a and 600b utilizes an imaging polarization unit 123 to capture the test pattern image projected in a specific polarization state by the associated projector itself.

The projection polarization unit 126 is configured such that two types of quarter-wavelength plates can be used interchangeably therein, and that the projection light can selectively be converted into right circular polarization light or left circular polarization light, based on instructions from the control unit 101. The imaging polarization unit 123 is also configured such that two types of quarter-wavelength plates can be used interchangeably therein, and that the imaging polarization unit 123 can selectively transmit only right circular polarization light or left circular polarization light in incident light from an imaging object, based on instructions from the control unit 101.

An operation (single projection operation) in the case of using the projector 600a (or 600b) singly is described hereinafter with reference to FIG. 4.

When AC power is supplied to the power input unit 130, the control unit 101 is activated. Thus, the process described in the flowchart illustrated in FIG. 4 is started.

In step S001, the control unit 101 monitors the operation unit 102 and the communication unit 115 and waits for issuance of a power-on instruction.

When a power-on instruction is issued, in step S002, the control unit 101 refers to a flag stored in the internal memory 116 and determines whether stereo projection is set. In this case, it is assumed that the stereo projection is not set (Flag=0). Then, control proceeds to step S003.

In step S003, the control unit 101 issues, to the power supply unit 103, an instruction to supply electric power to each block. Thus, the control unit 101 brings each block into a standby state. After power is on, the control unit 101 instructs the light source controlling unit 108 to cause the light source 106 to output light.

In step S004, to perform focusing, the control unit 101 loads a test pattern image preliminarily stored in the internal memory 116 and causes the liquid crystal unit 104 via the image processing unit 117 to display the test pattern image. The control unit 101 makes the projection polarization unit 126 a predetermined default state (e.g., right circular polarization light) and brings the imaging polarization light unit 123 into the same polarization state as the default state of the projection polarization unit 126.

In step S005, the control unit 101 captures test pattern image by the imaging unit 124. The focusing lens of the projection optical system 107 is driven so that the sharpness of the captured cross hatched image is highest. Consequently, the focus of the projection optical system 107 is adjusted. The control unit 101 functions as the projection control means for adjusting the focus as the projection condition.

In step S006, the control unit 101 erases the test pattern displayed in the liquid crystal unit 104. In step S007, the control unit 101 ends the process of the flow illustrated in FIG. 4. Then, the projector 100 shifts to the normal projection state.

An operation of the projectors 600a and 600b in the case of performing the stereo projection is described hereinafter. Both of the control units 101 of the projectors 600a and 600b set flags indicating a stereo projection mode (Flag=1) as the flags indicating the projection state. The value of the flag is stored in the internal memory 116. This setting can preliminarily be input by the operation unit 102 of each of the projectors 600a and 600b. Alternatively, this setting can preliminarily be set from the communication unit 115. When one of the projectors 600a (or 600b) is activated, an imaging means detects that the other projector 600b (or 600a) projects an image onto the same screen. And it may be notified by communication that the projectors 100a and 100b are provided in the stereo projection configuration. In addition, the setting can be performed using an identifier adapted to have an integer value such that if the integer value is 0, the identifier indicates a stereo projection configuration, and that if the integer value is other than 0, the integer value identifies a stereo projection set, instead of using the flag. This method can be applied to a plurality of stereo projection sets.

In step S001, it is assumed that AC power is supplied to the projectors 600a and 600b, that the projector 600a is used as a master, and that a user gives a power-on instruction to the projector 600a.

In step S002, the control unit 101 refers to the flag indicating stack projection, which is stored in the internal memory 116, and determines whether the configuration is set to the stereo projection configuration. As described above, the stereo projection mode is set (Flag=1), control proceeds to step S008.

In step S008, the projector 600a is treated as a master, because the projector 600a receives a power-on instruction from a user. Then, the control of the projector 600a proceeds to step S009.

In step S009, the projector 600a broadcasts, to devices connected thereto, an inquiry about the projectors configured to perform the stereo projection, using the communication unit 115. The inquiry reaches the projector 600b, and then the projector 600b sends to the projector 600a a response indicating that the projector 600b configures the stereo projection configuration. The projector 600a receives the response and identifies the presence of one or more projectors (the single projector 600b in the present exemplary embodiment) configuring the stereo projection configuration other than the projector 600a.

In step S010, the projector 600a determines how wavelength ranges of test pattern projection light are assigned to the respective projectors configuring the stereo projection configuration. Specifically, a table illustrated in FIG. 5C is preliminarily stored in the internal memory 116. Then, the polarization property to be assigned to each projector is determined by referring the stored table according to the number of projectors configuring the stereo projection configuration. For example, the polarization property assigned to the projector 600a (first) is set as right circular polarization light, while the polarization property assigned to the projector 600b (second) is set as left circular polarization light.

In step S011, the projector 600a instructs the projector 600b to be activated, which is identified in step S009 as configuring the stereo projection configuration other than the projector 600a.

In step S012, the projector 600a instructs the projector 600b to be subjected to the assignment of the polarization property determined in step S010 thereto.

In step S013, the projector 600a causes the light source 106 thereof to emit light, similarly to step S003.

In step S014, the projector 600a projects and displays a test pattern image to and on the screen 620, similarly to step S004. However, the projector 600a projects the test pattern image in the wavelength range previously determined in step S010. According to the foregoing description, the polarization property assigned to the projector 600a is right circular polarization light. Thus, the control unit 101 controls the projection polarization unit 126 and the imaging polarization unit 123 to convert the test pattern image into right circular polarized light. Consequently, the test pattern image is projected in the right circular polarized state.

In step S015, the projector 600a captures the test pattern image projected on the screen 620 and adjusts the focus of the projection optical system 107, similarly to step S005. The imaging polarization unit 123 is controlled to the same polarization property as the projection polarization unit 126. Thus, only the test pattern image, which is projected by the projector 600a, is incident upon the imaging unit 124. The projector 600a drives the focusing lens of the projection optical system 107 such that the sharpness of the captured test pattern image is high. The control unit 101 of the projector 600a functions as a projection control means for adjusting the focus as the projection condition.

In step S006, the projector 600a stops the projection of the test pattern image.

In step S007, the projector 600a shifts to the normal projection state.

An operation of the projector 600b instructed by the projector 600a to be activated is described hereinafter. The projector 600b serves as a slave.

In step S002, the control unit 101 of the projector 600b refers to the flag stored in the internal memory 116 and determines whether the stack projection is set. Since the stack projection is set (Flag=1), as described above, control proceeds to step S008.

In step S008, the projector 600b is treated as a slave, because the projector 600b receives a power-on instruction from another projector (the projector 600a in the present exemplary embodiment). Accordingly, control proceeds to step S016.

In step S016, the projector 600b is instructed from the projector 600a serving as the master to be subjected to the assignment of the polarization property of the test pattern projection light, which is determined in step S010 by the master, in other words, left circular polarization light in this case.

In step S017, the projector 600b causes the its own light source 106 to emit light, similarly to steps S003 and S013.

In step S018, the projector 600b displays the test pattern image with the projection light having the notified polarization property. Specifically, the polarization property assigned to the projector 600b is left circular polarized light, as described above. Thus, the control unit 101 controls the projection polarization unit 126 and the imaging polarization unit 123 to convert the test pattern image into left circular polarization light. Consequently, the test pattern image is projected in left circular polarized state.

In step S019, the projector 600b captures the test pattern image projected onto the screen 620 and adjusts the focus of the projection optical system 107, similarly to step S015. The imaging polarization unit 123 is controlled to the same polarization property as the projection polarizing unit 126. Thus, only the test pattern image projected by the projector 600b is incident upon the imaging unit 124. The projector 600b drives the focusing lens of the projection optical system 107 so that the sharpness of the imaged test pattern image is high. The control unit 101 of the projector 600b functions as the projection control means for adjusting the focus as the projection condition.

In step S006, the projector 600b stops the projection of the test pattern image.

In step S007, the projector 600b shifts to the normal projection state.

Thus, in the present exemplary embodiment, when the stereo projection using a plurality of projectors is performed, the projector first receiving a power-on instruction from a user is set as a master, while the other projectors are set as slaves, the power-on of each of which is instructed by the master. The master determines the polarization properties of the test pattern display, which are assigned to the projectors to be orthogonal to each other. Then, the master notifies the projectors of the determined polarization properties assigned thereto. The projectors project the test pattern images, which have polarization properties orthogonal to each other. Thus, each projector can capture only the image projected by itself. Accordingly, the projectors can simultaneously adjust the focus thereof.

The present exemplary embodiment has been described, in which each of the projectors 600a and 600b is caused to preliminarily store information indicating that the projectors 600a and 600b configure the stereo projection configuration and actively polarizes the projection light. However, the present invention is not limited to the present exemplary embodiment. The present invention can be applied to the configuration adapted so that each projector can know the polarization property assigned thereto. For example, the system can be configured to install a filter for converting projected light into circular polarized light outside the projector, and then causing the projector to communicate with the memory attached to the filter to obtain stored information representing the polarization property of the filter.

The present exemplary embodiment is configured so that the conversion of the projected light into circular polarized light and the transmission are performed. The present invention is not limited to the circular polarized light. The present invention can be applied to the configuration adapted so that the light projected by each of the projectors can be separated when the image is captured. Thus, the present invention can be applied to a configuration in which the projected light is converted into linearly polarized light. For example, the system can be configured so that a polarization element capable of converting the projected light into P-polarized light or S-polarized light is located in the optical system, and then, the P-polarized light and the S-polarized light are associated with two projectors, as described in FIG. 5D.

If the projected light is already converted into linear polarized light, the above configuration can be implemented, in which the projectors 600a and 600b are installed by inclining the body of one of the projectors 600a and 600b by an angle of 90 degrees with respect to that of the other projector. In the latter case, the control unit 101 acquires an output value of the tilt sensor 118 to thereby detect whether the body is inclined by an angle of 90 degrees. Then, according to a result of the detection, the projector can know its own polarization property.

The present exemplary embodiment can be arbitrarily combined with the above exemplary embodiment. The present invention can be applied to a stereo projection configured by two sets of the stack projection including two projectors.

Although the exemplary embodiment adapted to divide the projectors configuring the stereo projection configuration into the master and the slave is described, the system can be configured such that the master serving as the control unit is set to be an external control device (e.g., a PC), and that each projector is set as the slave. In this case, steps concerning the projection and the adjustment of the projector itself in the flow illustrated in FIG. 4 are unnecessary for the flow of a process performed by the external control device (e.g., a PC). Then, the control device executes mainly the processing and the instructions corresponding to steps S009 to S012 illustrated in FIG. 4.

A fifth exemplary embodiment is described hereinafter. The fourth exemplary embodiment adjusts the focus as an example of the projection condition. However, the present invention can be applied to the adjustment of another projection condition. The other projection conditions are, e.g., the adjustment of the zoom ratio and the keystone distortion correction. Hereinafter, the exemplary embodiment is described, in which the region of the projected image is in agreement with a predetermined rectangular range of the screen using both of the adjustment of the zoom ratio and the keystone distortion correction concurrently.

A test pattern image that facilitates the discrimination of the edges of the projected image of the test pattern is employs. Then, the adjustment of the zoom ratio of the projected image and the correction of the keystone distortion correction are executed, instead of performing a focusing operation (to be performed at the master in steps S018 and S019, or at the slave in steps S018 and S019) illustrated in FIG. 4.

For example, the coordinates of the four corners of the projected image are detected from an image obtained by capturing the projected test pattern image. Then, the zoom ratio of the projected image is adjusted, and the keystone distortion is corrected such that the coordinates of the four corners are in agreement with those of the four corners of a desired region, in which a projected image is displayed, on the screen. The coordinates of the four corners of the desired region can preliminarily be measured. Alternatively, the coordinates of the four corners of the desired region can be determined according to a result of simultaneously imaging the projected image. The coordinates of the four corners of the desired region can be determined from the captured image by marking the four corners on the screen with a minute reflection material or a minute color material.

Other Embodiments

As described above, one of the present disclosure is directed to a projection display system including a plurality of projection display apparatuses reduced in adjustment time, and to such a projection display apparatus. According to the one of the present disclosures, the projection display apparatuses can project different adjustment images and capture the projected images. Thus, the projection display apparatuses can simultaneously adjust projection conditions. Accordingly, time taken to adjust the projection conditions may be reduced.

Apparently, the present invention can be accomplished by supplying an apparatus with a storage medium in which a software program code which implements the functions of the above exemplary embodiments is stored. In this case, a computer (or central processing unit (CPU) or micro-processor unit (MPU)) including a control unit of the apparatus supplied with the storage medium reads out and executes the program code stored in the storage medium.

In this case, the program code itself read from the storage medium implements the functions of the above exemplary embodiments. Thus, the program code itself and the storage medium in which the program code is stored constitute the present invention.

For example, a flexible disk, a hard disk, an optical disk, a magneto-optical disk, a compact disc read-only memory (CD-ROM), a compact disc recordable (CD-R), a magnetic tape, a nonvolatile memory card, and a ROM can be used as the storage medium for supplying the program code.

In addition, apparently, the above case includes a case where a basic system or an operating system (OS) or the like which operates on the computer performs a part or all of processing based on instructions of the above program code and where the functions of the above exemplary embodiments are implemented by the processing.

Besides, the above case also includes a case where the program code read out from the storage medium is written to a memory provided on an expansion board inserted into a computer or to an expansion unit connected to the computer, so that the functions of the above exemplary embodiments are implemented. In this case, based on instructions of the program code, a CPU or the like provided in the expansion board or the expansion unit performs a part or all of actual processing.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-187859 filed Aug. 25, 2010, which is hereby incorporated by reference herein in its entirety.

What is claimed is:

1. A projection system comprising a plurality of projection apparatuses, wherein each of the plurality of projection apparatuses comprises:
   a projection unit configured to project an image onto a projection surface; and
   an adjusting unit configured to adjust a state of displaying an image projected onto the projection surface by the projection unit, wherein the projection system further comprises:
   a controller configured to cause the projection units of the plurality of projection apparatuses to simultaneously project test images in different forms,
   wherein the controller controls the adjusting unit of each of the plurality of projection apparatuses to adjust a state of displaying an image projected onto the projection surface by the projection unit based on each state of displaying of the test images in different forms.

2. The projection system according to claim 1, wherein the adjusting unit adjusts a focus, sharpness, a projection range, or a zoom rate of the projection unit.

3. The projection system according to claim 1, wherein the adjusting unit further includes a focusing lens, a zoom lens and an image processing unit.

4. The projection system according to claim 1, wherein the controller is incorporated into one of the plurality of projection apparatuses.

5. The projection system according to claim 1, wherein the test images in different forms are those in different colors, those in different polarization states, or those in different positions.

6. A projection apparatus comprising:
   a projection unit configured to project an image onto a projection surface; an adjusting unit configured to adjust a state of displaying an image projected onto the projection surface by the projection unit;
   an obtaining unit configured to acquire information concerning a state of displaying an image projected onto the projection surface;
   a communication unit configured to communicate with another projection apparatus; and
   a controller configured to control the projection unit such that the projection unit projects a test image in a first format, and to instruct the another projection apparatus to project a test image in a second format differing from the first format simultaneously with projection of the test image in the first format,
   wherein the controller controls the adjusting unit to adjust a state of displaying an image projected onto the projection surface by the projection unit, based on the state of displaying the image in the first format acquired by the obtaining unit.

7. The projection apparatus according to claim 6, wherein the adjusting unit adjusts a focus, sharpness, a projection range, or a zoom rate of the projection unit.

8. The projection apparatus according to claim 6, wherein the adjusting unit further includes a focusing lens, a zoom lens and an image processing unit.

9. The projection apparatus according to claim 6, wherein the test images indifferent forms are those indifferent colors, those in different polarization states, or those in different positions.

10. The projection apparatus according to claim 6, wherein the controller instructs the other projection apparatus to adjust a state of displaying an image projected onto the projection surface.

11. A projection system comprising a plurality of projection apparatuses, wherein each of the plurality of projection apparatuses comprises:
    a projection unit configured to project an image onto a projection surface; and
    an adjusting unit configured to adjust a state of displaying an image projected onto the projection surface by the projection unit, wherein the projection system further comprises:
    a controller configured to cause the projection unit of the plurality of projection apparatuses to project test images in different forms, respectively,
    wherein the controller causes, in a state in which the projection unit of a first projection apparatus is displaying the test image, the projection unit of the projection apparatus other than the first projection apparatuses to project the test image, and wherein the controller controls the adjusting unit of each of the plurality of projection apparatuses to adjust a state of displaying an image projected onto the projection surface by the projection unit based on each state of displaying of the test images in different forms.

12. The projection system according to claim 11, wherein the adjusting unit adjusts a focus, sharpness, a projection range, or a zoom rate of the projection unit.

13. The projection system according to claim 11, wherein the adjusting unit includes a focusing lens, a zoom lens and an image processing unit.

14. The projection system according to claim 11, wherein the controller is incorporated into one of the plurality of projection apparatuses.

15. The projection system according to claim 11, wherein the test images indifferent forms are those indifferent colors, those in different polarization states, or those in different positions.

16. A projection apparatus comprising:
a projection unit configured to project an image onto a projection surface; an adjusting unit configured to adjust a state of displaying an image projected onto the projection surface by the projection unit;
an obtaining unit configured to acquire information concerning a state of displaying an image projected onto the projection surface;
a communication unit configured to communicate with another projection apparatus; and
a controller configured to control the projection unit such that the projection unit projects a test image in a first format, and to instruct the another projection apparatus to project a test image in a second format differing from the first format in a state in which the test image in the first format is projected, and
wherein the controller controls the adjusting unit to adjust a state of displaying an image projected onto the projection surface by the projection unit, based on the state of displaying the test image in the first format acquired by the obtaining unit.

17. The projection system according to claim 16, wherein the adjusting units adjusts a focus, sharpness, a projection range, or a zoom rate of the projection unit.

18. The projection system according to claim 16, wherein the adjusting unit further includes a focusing lens, a zoom lens and an image processing unit.

19. The projection system according to claim 16, wherein the test images indifferent forms are those indifferent colors, those in different polarization states, or those in different positions.

20. The projection system according to claim 16, wherein the controller instructs the other projection apparatus to adjust a state of displaying an image projected onto the projection surface.

* * * * *